United States Patent
Cheng et al.

(10) Patent No.: US 12,089,083 B2
(45) Date of Patent: Sep. 10, 2024

(54) ON-DEMAND MEASUREMENT GAP FOR INTER-FREQUENCY RRM MEASUREMENTS

(71) Applicant: QUALCOMM Incorporated, San Diego, CA (US)

(72) Inventors: Peng Cheng, Beijing (CN); Huichun Liu, Beijing (CN); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 17/286,668

(22) PCT Filed: Oct. 19, 2019

(86) PCT No.: PCT/CN2019/112063
§ 371 (c)(1),
(2) Date: Apr. 19, 2021

(87) PCT Pub. No.: WO2020/083121
PCT Pub. Date: Apr. 30, 2020

(65) Prior Publication Data
US 2021/0368374 A1    Nov. 25, 2021

(30) Foreign Application Priority Data
Oct. 19, 2019    (WO) .............. PCT/CN2018/111231

(51) Int. Cl.
*H04W 24/10*    (2009.01)
*H04W 56/00*    (2009.01)
(Continued)

(52) U.S. Cl.
CPC ......... *H04W 24/10* (2013.01); *H04W 56/001* (2013.01); *H04W 72/0453* (2013.01);
(Continued)

(58) Field of Classification Search
CPC ... H04W 24/10; H04W 24/08; H04W 56/001; H04W 80/02; H04W 36/0088;
(Continued)

(56) References Cited

U.S. PATENT DOCUMENTS 10,511,418 B2 * 12/2019 Tang .................... H04L 5/0082
10,681,576 B2    6/2020 Gheorghiu et al.
(Continued)

FOREIGN PATENT DOCUMENTS

WO    2016168178 A1    10/2016
WO    2018084571 A1    5/2018

OTHER PUBLICATIONS

Mediatek Inc: "Measurement Gaps in NR", 3GPP TSG-RAN WG2 Meeting #99, R2-1708253, Measurement Gaps in NR, 3rd Generation Partnership Project, Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017, pp. 1-3, XP051318153.
(Continued)

*Primary Examiner* — Rasheed Gidado
(74) *Attorney, Agent, or Firm* — QUALCOMM Incorporated

(57) ABSTRACT

Certain aspects of the present disclosure provide techniques for an on-demand measurement gap for inter-frequency radio resource management (RRM) measurements. A method for wireless communications by a base station (BS) includes configuring a user equipment (UE) in the serving cell for measurement of target cell (s) and with an on-demand measurement gap configuration for measuring the target cell (s). Neighbor cells in a same frequency can coordinate to align synchronization signal block (SSB) or channel state information reference signal (CSI-RS) transmission and provide timing information of the aligned SSB
(Continued)

or CSI-RS transmission to a cell in a different frequency. A method by a UE includes receiving an on-demand measurement gap configuration from a serving cell co and measuring target cell (s) based on the measurement gap configuration.

23 Claims, 17 Drawing Sheets

(51) Int. Cl.
    *H04W 72/04*     (2023.01)
    *H04W 72/0453*   (2023.01)
    *H04W 72/08*     (2009.01)
    *H04W 72/23*     (2023.01)
    *H04W 72/542*    (2023.01)
    *H04W 80/02*     (2009.01)

(52) U.S. Cl.
    CPC ......... *H04W 72/23* (2023.01); *H04W 72/542* (2023.01); *H04W 80/02* (2013.01)

(58) Field of Classification Search
    CPC ......... H04W 36/0085; H04W 36/0094; H04W 36/04; H04W 72/085; H04W 72/042; H04W 72/0453; H04W 72/23; H04W 72/542; H04W 72/27
    See application file for complete search history.

(56) References Cited

U.S. PATENT DOCUMENTS

| | | | | |
|---|---|---|---|---|
| 2009/0168731 A1* | 7/2009 | Zhang | ............ | H04L 1/1854 370/336 |
| 2016/0183263 A1* | 6/2016 | Liu | ............ | H04W 72/23 370/329 |
| 2016/0302098 A1* | 10/2016 | Gheorghiu | ............ | H04W 56/001 |
| 2016/0337916 A1 | 11/2016 | Deenoo et al. | | |
| 2018/0262313 A1 | 9/2018 | Nam et al. | | |
| 2019/0059093 A1* | 2/2019 | Cheng | ............ | H04L 5/0082 |
| 2019/0116530 A1* | 4/2019 | Da Silva | ............ | H04J 11/0076 |
| 2019/0132845 A1* | 5/2019 | Babaei | ............ | H04W 72/23 |
| 2019/0182900 A1* | 6/2019 | Cui | ............ | H04W 56/001 |
| 2019/0364452 A1* | 11/2019 | Hwang | ............ | H04W 56/00 |
| 2020/0120756 A1* | 4/2020 | Wang | ............ | H04L 5/0055 |
| 2020/0252997 A1* | 8/2020 | Sirotkin | ............ | H04W 88/10 |
| 2021/0409174 A1* | 12/2021 | Yum | ............ | H04B 7/06 |
| 2022/0046454 A1* | 2/2022 | Yiu | ............ | H04W 24/10 |

OTHER PUBLICATIONS

Qualcomm Incorporated: "UE Power Consumption Reduction in RRM Measurements", 3GPP TSG-RAN WG1 Meeting 1901, R1-1900913 UE Power Consumption Reduction in RRM Measurements, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 12, 2019, pp. 1-13, XP051576450.
Supplementary European Search Report—EP19877088—Search Authority—Munich—Jun. 24, 2022.
Intel Corporation: "Summary of Offline Discussions for Rel-15 NR Mobility", 3GPP TSG RAN WG1 Meeting #94bis, R1-1812033, Chengdu, China, Oct. 8-12, 2018, Oct. 12, 2018(Oct. 12, 2018), 15 Pages, sections 2-3.
International Search Report and Written Opinion—PCT/CN2018/111231—ISA/EPO—Jul. 9, 2019.
International Search Report and Written Opinion—PCT/CN2019/112063—ISA/EPO—Jan. 17, 2020.
Nokia et al., "CSI-RS base measurement for L3 mobility", 3GPP TSG-RAN WG4 Meeting#88, R4-1811312, Gothenburg, Sweden, Aug. 20-24, 2018, Aug. 11, 2018(Aug. 11, 2018), 4 Pages, section 2.
Nokia et al., "On Initial Access and Mobility for NR-U", 3GPP TSG RAN WG1 Meeting #94bis, R1-1810624, Chengdu, China, Oct. 8-12, 2018, Oct. 12, 2018 (Oct. 12, 2018), 9 Pages, sections 4-5.
NTT Docomo et al., "Remaining Issues on Measurement for Mobility Management", 3GPP Draft; 3GPP TSG RAN WG1 Meeting AH 1801, R1-1800655_Remaining Issues on Measurement for Mobility Management_Final, 3rd Generation Partnership Project (3GPP), Mobile Competence Centre; 650, Route Des Lucioles; F-06921 Sophia-Antipolis Cedex, France, vol. RAN WG1, No. Vancouver, Canada; Jan. 22, 2018-Jan. 26, 2018 Jan. 13, 2018, XP051384977.

\* cited by examiner

700

| Gap Pattern Id | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

FIG. 7

ON-DEMAND MEASUREMENT GAP FOR INTER-FREQUENCY RRM MEASUREMENTS

CROSS REFERENCE TO RELATED APPLICATIONS

This application is a national stage application under 35 U.S.C. 371 of PCT/CN2019/112063, filed Oct. 19, 2019, which claims priority to International Patent Cooperation Treaty Application No. PCT/CN2018/111231, filed Oct. 22, 2018, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for an on-demand measurement gap for inter-frequency radio resource management (RRM) measurements.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS) in a serving cell. The method generally includes configuring at least one user equipment (UE) in the serving cell for measurement of one or more target cells. The method generally includes configuring the at least one UE with an on-demand measurement gap configuration for measuring the one or more target cells.

Certain aspects provide a method for wireless communication by a BS. The method generally includes coordinating with one or more neighbor cells in a same frequency as the BS to align synchronization signal block (SSB) or channel state information reference signal (CSI-RS) transmission. The method generally includes providing timing information of the aligned SSB or CSI-RS transmission to a cell in a different frequency.

Certain aspects provide a method for wireless communication by a UE. The method generally includes receiving an on-demand measurement gap configuration from a serving cell configuring the UE for measurement of one or more target cells. The method generally includes measuring the one or more target cells based on the measurement gap configuration.

Certain aspects provide an apparatus for wireless communication in a serving cell. The apparatus generally includes means for configuring at least one UE in the serving cell for measurement of one or more target cells. The apparatus generally includes means for configuring the at least one UE with an on-demand measurement gap configuration for measuring the one or more target cells.

Certain aspects provide an apparatus for wireless communication. The apparatus generally includes means for coordinating with one or more neighbor cells in a same frequency as the apparatus to align SSB or CSI-RS transmission. The apparatus generally includes means for providing timing information of the aligned SSB or CSI-RS transmission to a cell in a different frequency.

Certain aspects provide an apparatus for wireless communication. The apparatus generally includes means for receiving an on-demand measurement gap configuration from a serving cell configuring the apparatus for measurement of one or more target cells. The apparatus generally includes means for measuring the one or more target cells based on the measurement gap configuration.

Certain aspects provide an apparatus for wireless communication in a serving cell. The apparatus generally includes at least one processor coupled with a memory and configured to configure at least one UE in the serving cell for measurement of one or more target cells. The at least one processor is further configured to configure the at least one UE with an on-demand measurement gap configuration for measuring the one or more target cells.

Certain aspects provide an apparatus for wireless communication. The apparatus generally includes at least one processor coupled with a memory and configured to coordinate with one or more neighbor cells in a same frequency as the apparatus to align SSB or CSI-RS transmission. The at least one processor is further configured to provide timing information of the aligned SSB or CSI-RS transmission to a cell in a different frequency.

Certain aspects provide an apparatus for wireless communication. The apparatus generally includes least one processor coupled with a memory and configured to receive an on-demand measurement gap configuration from a serving cell configuring the apparatus for measurement of one or more target cells. The at least one processor is further configured to measure the one or more target cells based on the measurement gap configuration.

Certain aspects provide a computer readable medium having computer executable code stored thereon for wireless communication in a serving cell. The computer executable code generally includes code for configuring at least one UE in the serving cell for measurement of one or more target cells. The computer executable code generally includes code for configuring the at least one UE with an on-demand measurement gap configuration for measuring the one or more target cells.

Certain aspects provide a computer readable medium having computer executable code stored thereon for wireless communication. The computer executable code generally includes code for coordinating with one or more neighbor cells in a same frequency as the apparatus to align SSB or CSI-RS transmission. The computer executable code generally includes code for providing timing information of the aligned SSB or CSI-RS transmission to a cell in a different frequency.

Certain aspects provide a computer readable medium having computer executable code stored thereon for wireless communication. The computer executable code generally includes code for receiving an on-demand measurement gap configuration from a serving cell configuring the apparatus for measurement of one or more target cells. The computer executable code generally includes code for measuring the one or more target cells based on the measurement gap configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 is a table showing example measurement gap patterns.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
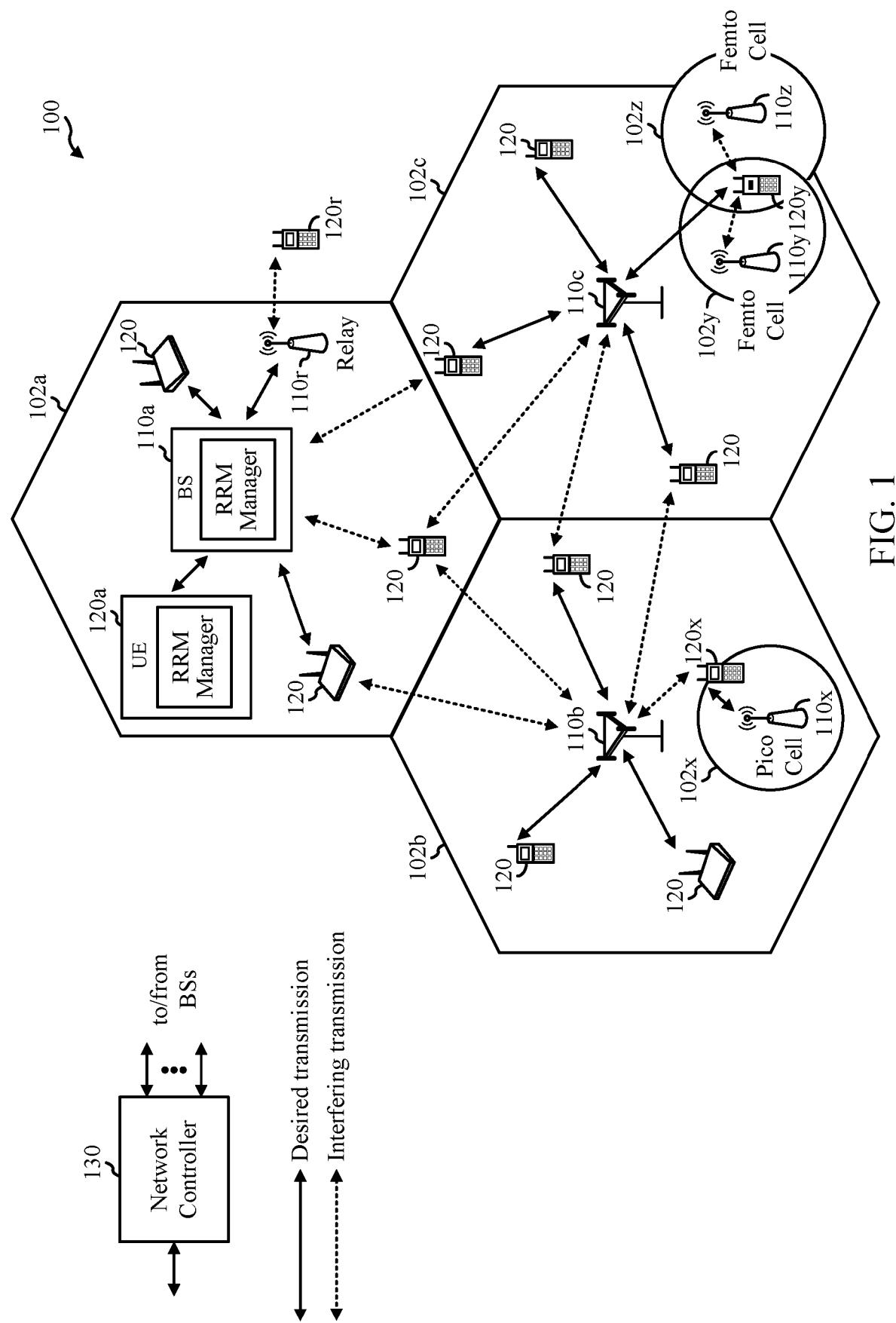
FIG. 1 is a block diagram conceptually illustrating an example telecommunications system, in accordance with certain aspects of the present disclosure.

Aspects of the present disclosure provide apparatus, methods, processing systems, and computer readable mediums for an on-demand measurement gap for inter-frequency radio resource management (RRM) measurements.

In certain systems, such as NR, the user equipment (UE) may be configured to measure a target cell SSB for inter-frequency RRM measurements. In an asynchronous network, the synchronization signal block (SSB) from the serving cell and the target cells have a time offset and the SSB for the target cell may be outside the SSB measurement timing configuration (SMTC) window of the serving cell. Thus, the UE blindly detects the target cell(s) SSB. For channel state information reference signal (CSI-RS) based RRM measurements, a periodic UE-specific CSI-RS can be used. Even in synchronous network deployments, neighbor cells may configure different sets of CSI-RS than the serving cell. Thus, the UE cannot derive the neighbor cell's CSI-RS based on the serving cell timing.

In certain systems, such as long term evolution (LTE) and Release-15 NR systems, a periodic measurement gap is configured for RRM measurements. The periodic measurement gap is not effective for SSB-based or CSI-RS based RRM measurements in the asynchronous network because different cells in the same frequency may transmit SSB at different timings. Thus, a frequency layer specific SMTC may not cover all cells. And, even for synchronous networks, because CSI-RS is UE specific, different cells can send different CSI-RS for the UE to measure even if the cells are in the same frequency. Therefore, techniques for SSB-based and CSI-RS based RRM measurement gap for synchronous and asynchronous networks are desired.

Accordingly, aspects of the present disclosure provide an on-demand measurement gap for inter-frequency RRM measurements by at the UE. In some examples, the on-demand measurement gap is provided for CSI-RS based RRM measurements and/or for SSB-based RRM measurements in an asynchronous network deployment.

The following description provides examples of an on-demand measurement gap for inter-frequency RRM measurements, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used various wireless networks and radio technologies. While aspects may be described herein using terminology commonly associated with 3G, 4G, and/or 5G wireless technologies, aspects of the present disclosure can be applied in other generation-based communication systems, including later technologies.

NR access (e.g., 5G NR technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, the wireless communication network 100 may be a 5G NR network.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul. The BS s 110 communicate with UEs 120a-y (each also individually referred to herein as UE 120 or collectively as UEs 120) that may be dispersed throughout the wireless communication network 100. Each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Wireless communication network 100 may support synchronous or asynchronous operation. For synchronous operation, the BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for synchronous and asynchronous operation.

As will be described in more detail herein, a BS 110 in the wireless communication network 100, such as a BS 110a in a serving cell 102a configures a UE 120 in the serving cells 102a for measurement of one or more target cells, such as one more other BSs 110 in the cells 102b or 102c. The BS 110a configures the UE 120 with an on-demand measurement gap configuration for measuring the one or more target cells 102b or 102c. As shown in FIG. 1, the BS 110a includes a RRM manager 112. The RRM manager 112 may be configured for the on-demand measurement gap for RRM inter-frequency measurements, in accordance with aspects of the present disclosure. The UE 120 receives the on-demand measurement gap configuration from the BS 110a in the serving cell 102a and measures the one or more target cells 102b or 102c based on the measurement gap configuration. As shown in FIG. 1, the UE 120a includes a RRM manager 122. The RRM manager 122 may be configured for the on-demand measurement gap for RRM inter-frequency measurements, in accordance with aspects of the present disclosure.

Figure 2:
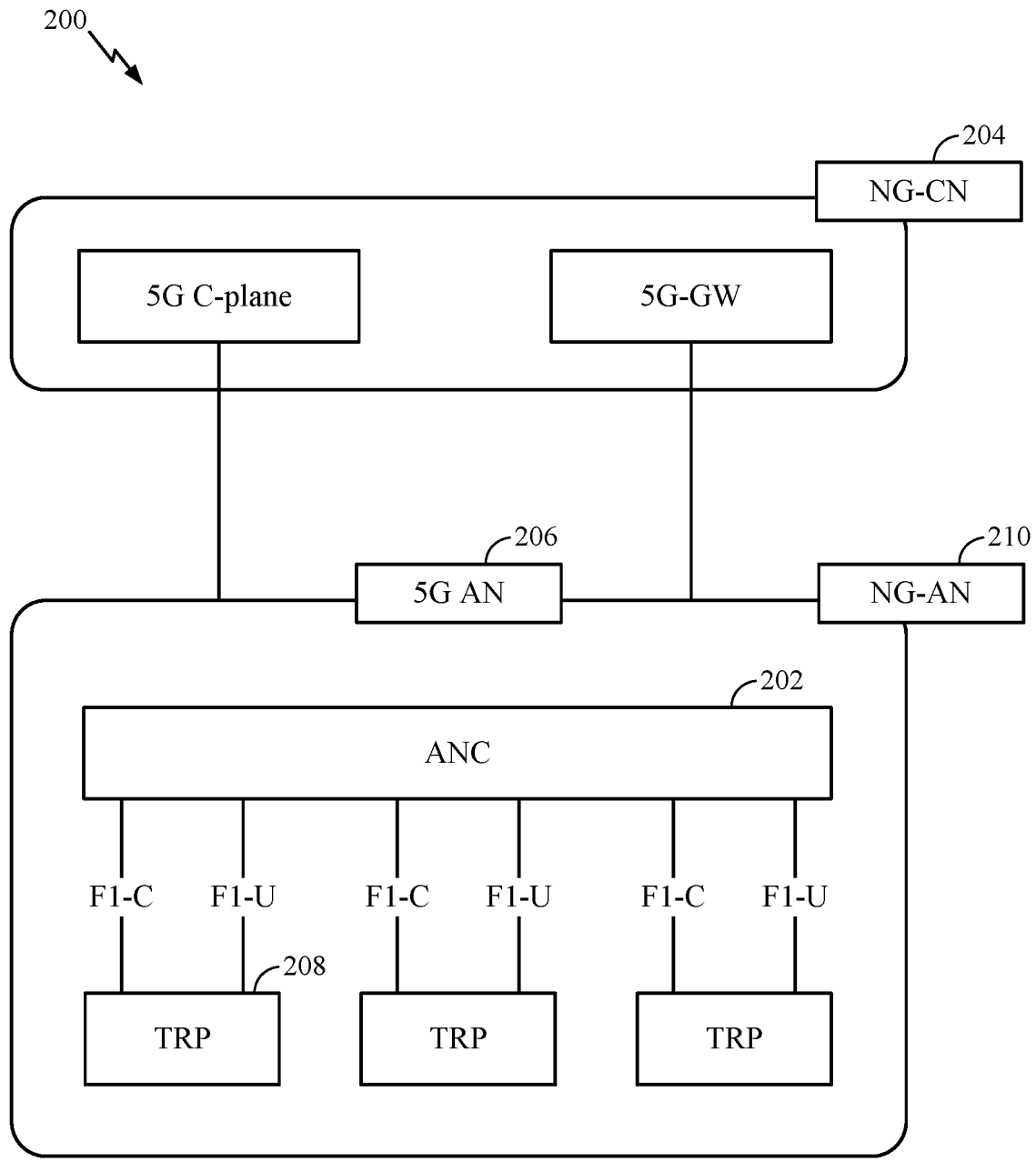
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/ or jitter). The logical architecture of distributed RAN 200 may share features and/or components with LTE. For example, next generation access node (NG-AN) 210 may support dual connectivity with NR and may share a common fronthaul for LTE and NR. The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
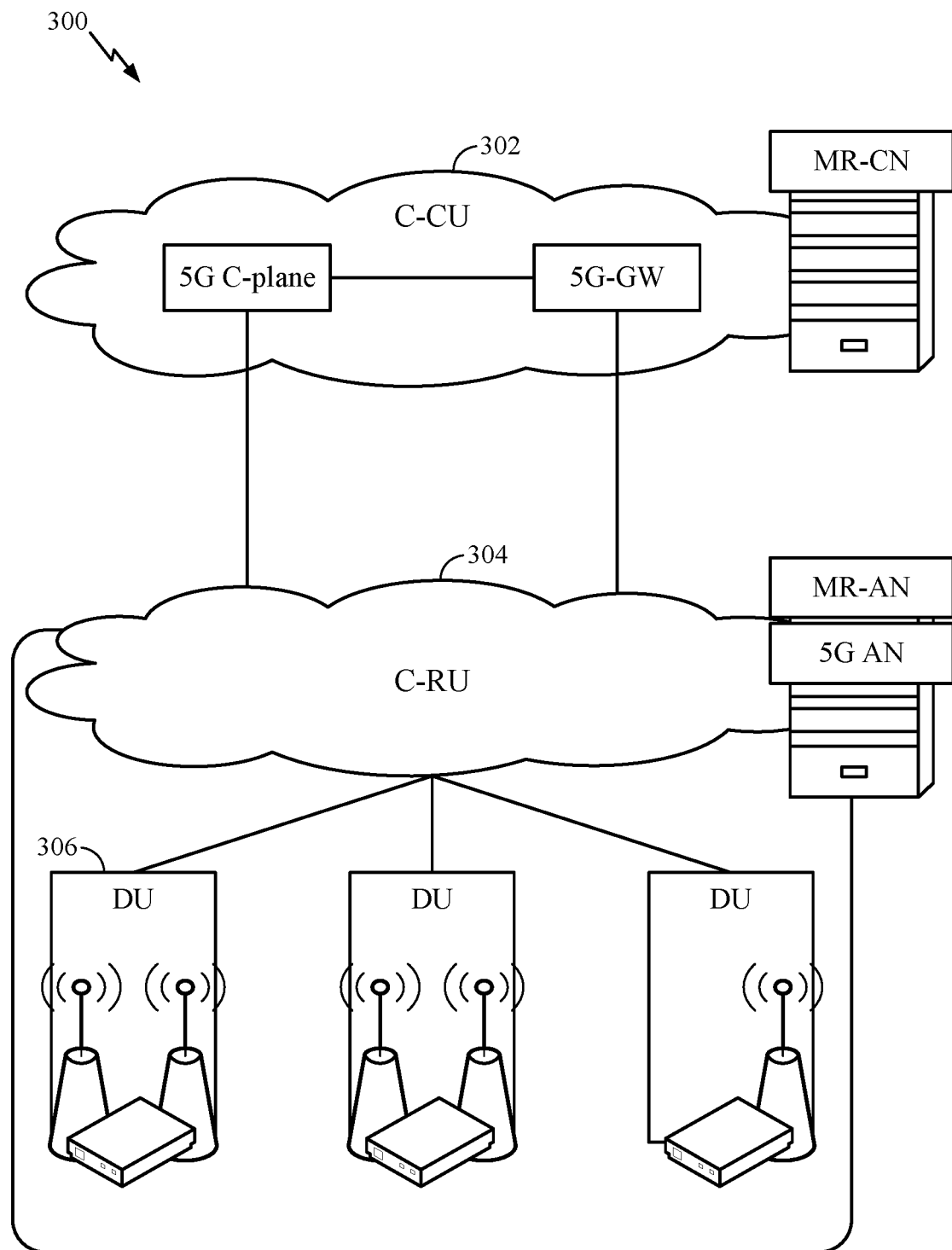
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity. A centralized RAN unit (C-RU) 304 may host one or more ANC functions. Optionally, the C-RU 304 may host core network functions locally. The C-RU 304 may have distributed deployment. The C-RU 304 may be close to the network edge. A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
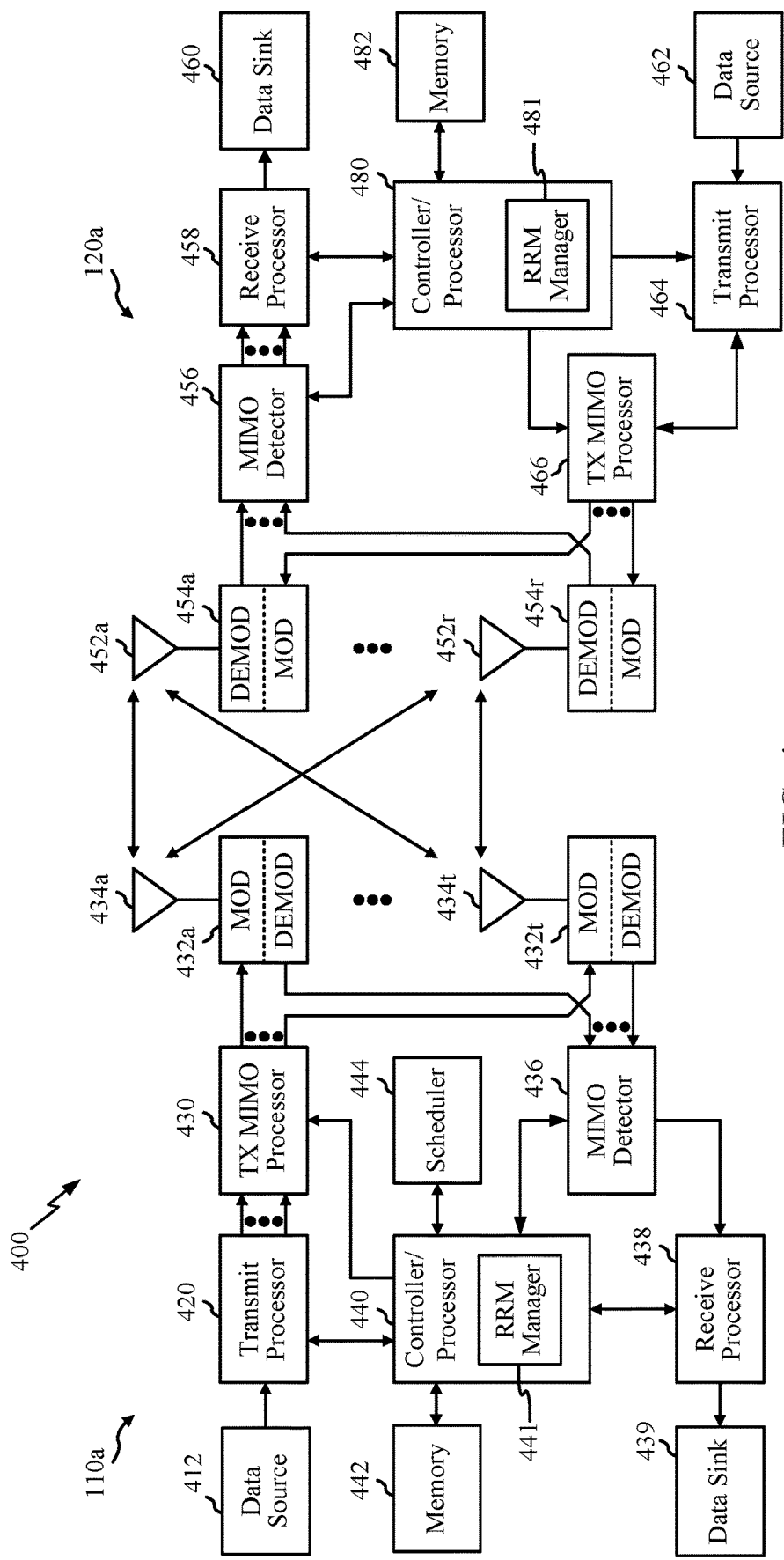
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a-432t may be transmitted via the antennas 434a-434t, respectively.

At the UE 120a, the antennas 452a-452r may receive the downlink signals from the BS 110a and may provide received signals to the demodulators (DEMODs) in transceivers 454a-454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a-454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the BS 110a. At the BS 110a, the uplink signals from the UE 120 may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

Antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein for an on-demand measurement gap for inter-frequency RRM measurements. For example, as shown in FIG. 4, the controller/processor 440 of the BS 110a has an RRM manager 441 that may be configured for an on-demand measurement gap for inter-frequency RRM measurements, according to aspects described herein. As shown in FIG. 2, the controller/processor 480 of the UE 120a has an RRM manager 441 that may be configured for an on-demand measurement gap for inter-frequency RRM measurements, according to aspects described herein. Although shown at the controller/processor, other components of the UE 120a and BS 110a may be used to perform the operations described herein. The memories 442 and 482 may store data and program codes for BS 110 and UE 120, respectively. A scheduler 444 may schedule UEs for data transmission on the downlink and/or uplink.

Figure 5:
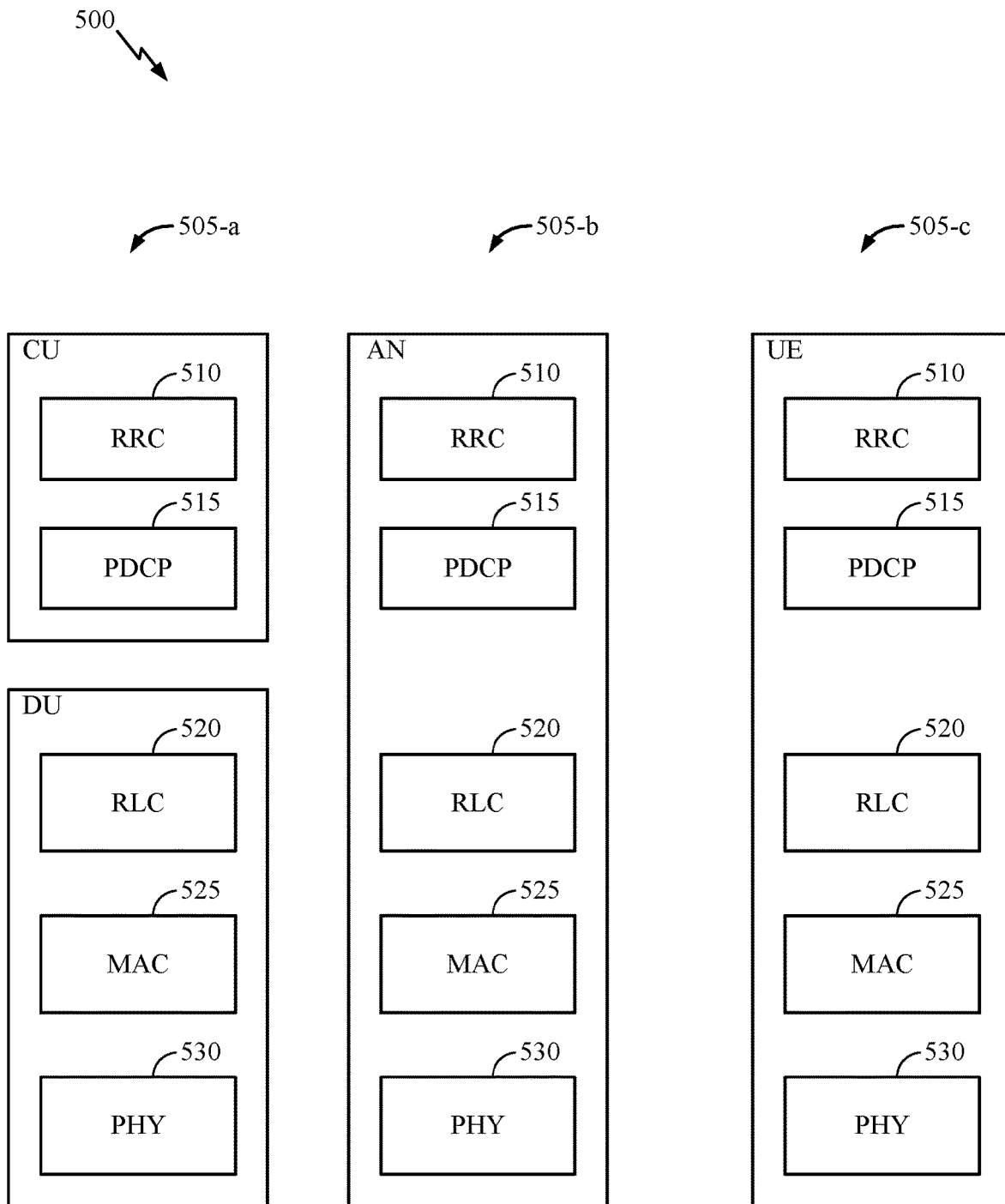
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Certain wireless networks utilize orthogonal frequency division multiplexing (OFDM) on the downlink and single-carrier frequency division multiplexing (SC-FDM) on the uplink. NR may utilize OFDM with a cyclic prefix (CP) on the uplink and downlink and include support for half-duplex operation using time division duplexing (TDD). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

The NR resource block (RB) is 12 consecutive frequency subcarriers. NR may support a base subcarrier spacing of 15 KHz and other subcarrier spacing may be defined with respect to the base subcarrier spacing (SCS), for example, 30 kHz, 60 kHz, 120 kHz, 240 kHz, etc. In NR, a subframe is 1 ms, but the basic TTI is referred to as a slot. A subframe contains a variable number of slots (e.g., 1, 2, 4, 8, 16, ... slots) depending on the subcarrier spacing. The symbol and slot lengths scale with the subcarrier spacing. The CP length also depends on the subcarrier spacing.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 6:
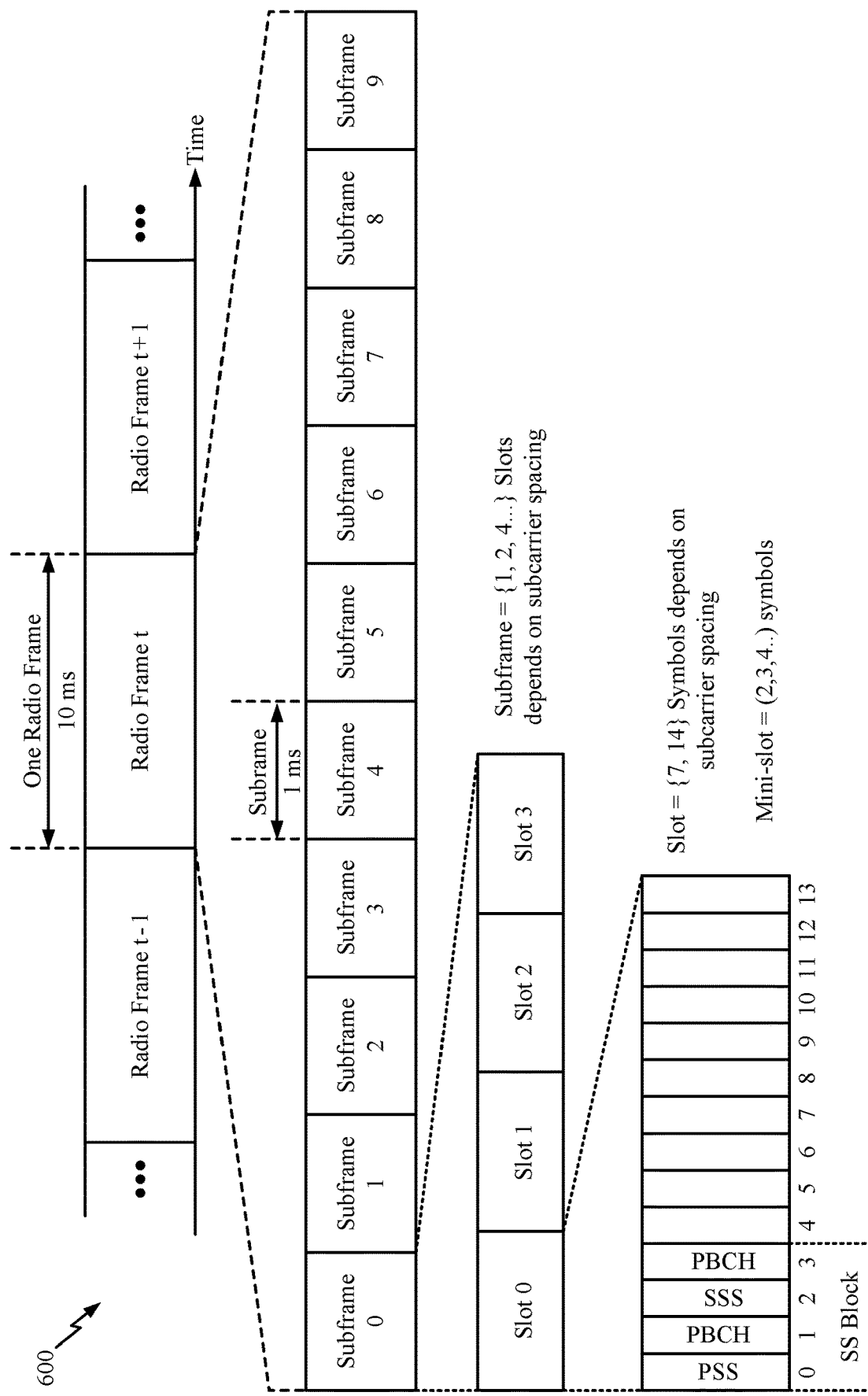
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched.

The link directions may be based on the slot format. Each slot may include DL/UL data as well as DL/UL control information.

In NR, a SSB is transmitted. The SSB includes a PSS, a SSS, and a two symbol PBCH. The SSB can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmW. The up to sixty-four transmissions of the SSB are referred to as the SS burst set. SSBs in an SS burst set are transmitted in the same frequency region, while SSBs in different SS bursts sets can be transmitted at different frequency locations.

In certain systems, such as Release 15 of the 3GPP wireless standards for NR (new radio or 5G access technologies), radio resource management (RRM) measurements are performed. RRM measurements may include, for example, channel quality indicator (CQI), reference signal received power (RSRP), reference signal received quality (RSRQ), and/or received signal strength indicator (RSSI) measurements. RRM measurements may be used, for example, for mobility decisions, link adaptation, scheduling, and/or other uses.

In certain systems, such as long term evolution (LTE) and Release-15 NR systems, a periodic measurement gap is configured for RRM measurements. FIG. 7 is a table 700 showing example measurement gap patterns. In table 700 shown in FIG. 7, the gap pattern ID (e.g., an index value) is associated with a duration (length) of the measurement gap (MGL) and a periodicity of the measurement gap (MGRP). The network can configure the offset of the gap in the MGRP. The gap pattern is frequency specific. For example, patterns 0-3 are for LTE systems/frequencies, patterns 4-11 for NR frequency range 1 (e.g., sub-6 GHz); and patterns 12-23 for NR FR2 (e.g., mmW).

Certain systems, such as NR, also use RRM for support of multi-beam operation (e.g., for mmW deployments). The RRM measurements may include measuring different beams. The RRM measurements may capture changes of the cell. In NR, the single cell quality can be derived from multiple beams (from the cell) which may have different qualities. In some examples, the quality is derived based on a linear average of certain beams (e.g., beams above a quality threshold). In some examples, the single cell quality measurements may be used for handover decisions (e.g., by the network). In NR, RRM measurements can be reported at the beam level (e.g., L3 reporting), as well as the cell level.

In certain systems, the common reference signal (CRS) is used for RRM measurements. In NR, the NR synchronization signal (NR-SS) and/or the channel state information reference signal (CSI-RS) can be used for performing RRM measurements. CSI-RS based RRM may provide improved beam resolution. In some cases, only one type of RS is configured for one periodic and/or event-triggered measurement report.

For asynchronous network deployments, the SS block (SSB) may be used for RRM measurements (e.g., referred to as SSB-based RRM measurement). SSB may be an "always on" reference signal. One example of the SSB is shown in FIG. 6, as discussed above. As shown in FIG. 6, the SSB includes 1 symbol PSS, 1 symbol SSS, and 2 symbols PBCH that time division multiplexed (TDM'd) in consecutive symbols. As discussed above, the SSBs may be organized into SS bursts to support beam sweeping. In some examples, the transmission of SSBs within an SS burst are confined to a window. The SSB can be transmitted up to L times (e.g., L=64 times), in L different slots, with up to L different beam directions for mmW, for example, according to a beam-sweeping pattern. The transmissions may be referred to as SYNC burst set. Multiple SYNC burst sets may be transmitted at a periodicity.

A cell may be associated with a SSB measurement timing configuration (SMTC) based on its configuration for SSB transmission. The SMTC may define an SMTC window duration (e.g., {1, 2, 3, 4, 5} ms); an SMTC window timing offset (e.g., {0, 1, SMTC periodicity-1} ms); and an SMTC periodicity (e.g., {5, 10, 20, 40, 80, 160} ms). The SMTC may be configured by the network for SSB-based RRM measurements. For example, the SMTC may be configured with a measurement object.

Figure 8:
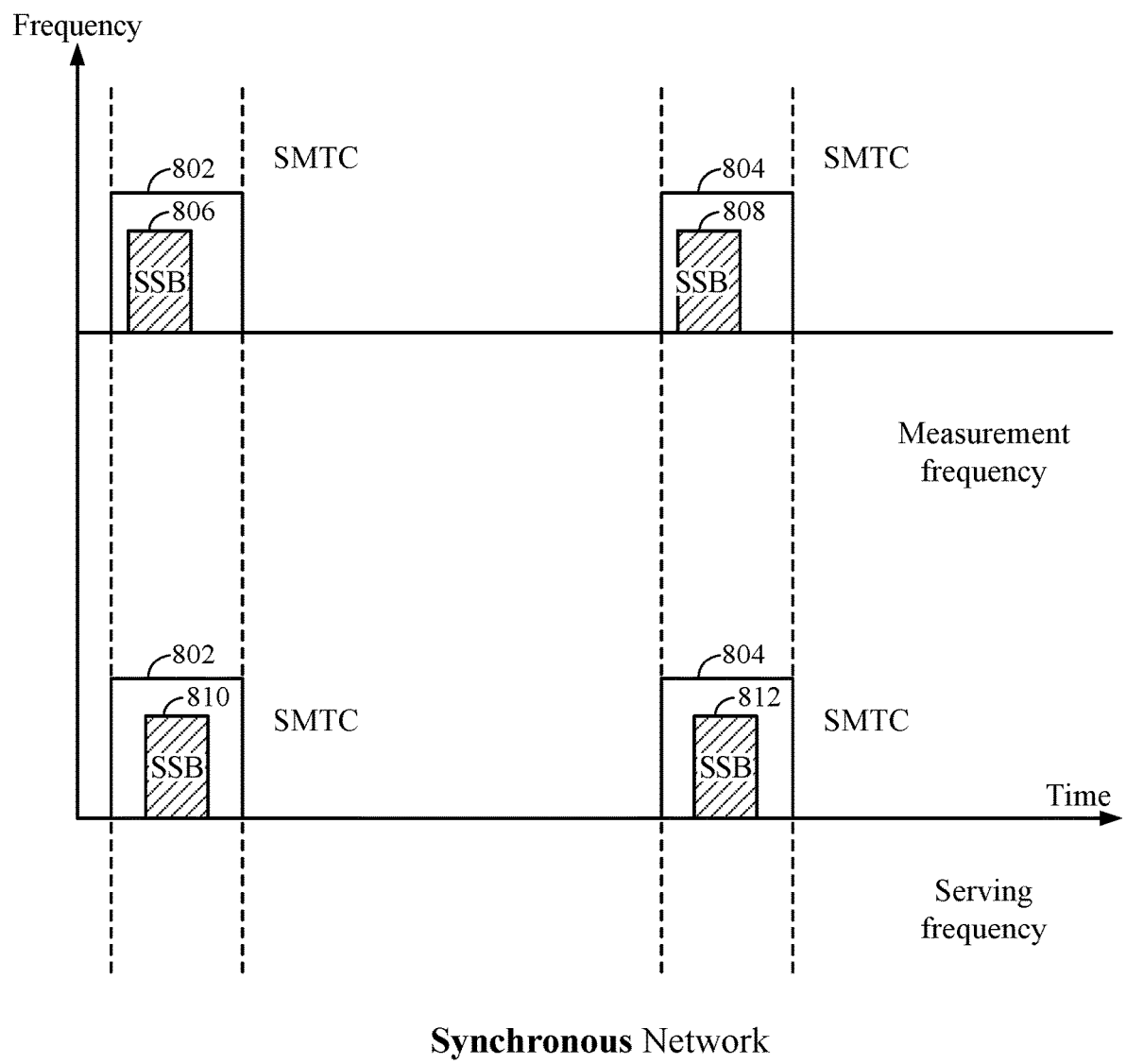
FIG. 8 is an example of synchronization signal block (SSB) transmission in a synchronous network, in accordance with certain aspects of the present disclosure.
Figure 9:
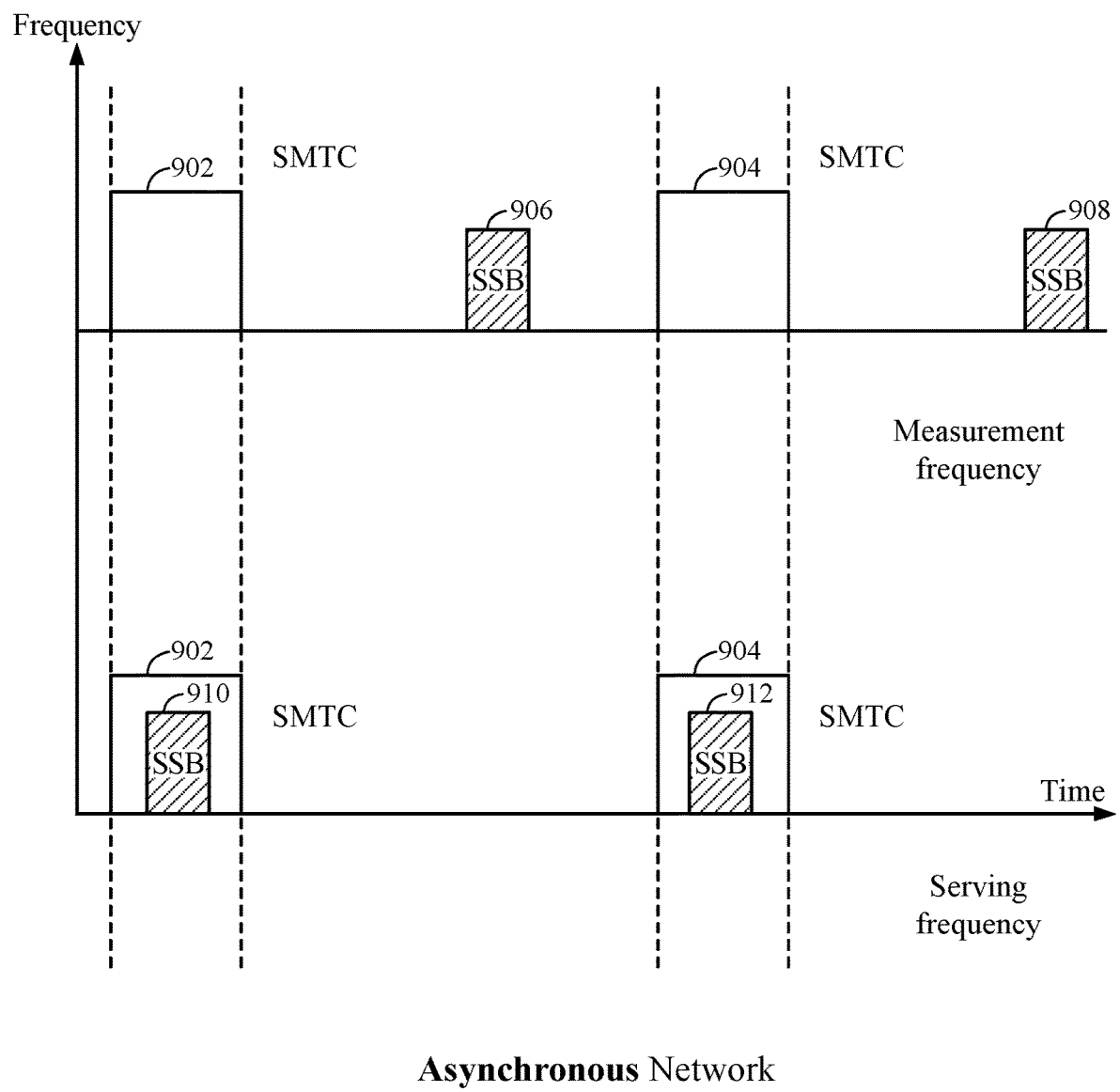
FIG. 9 is an example of SSB transmission in an asynchronous network, in accordance with certain aspects of the present disclosure.

In some systems, such as Release-15 NR, the network is synchronous. In a synchronous network, the timing offset between cells is small. Thus, as shown in FIG. 8, in a synchronous network the target cell SSBs 806, 808 fall within the same SMTC window 802 as the serving cell SSBs 810, 812. In certain systems; however, such as Release-16 NR, the network may be asynchronous. In this case, the target cell(s) to measure in the target frequency may be asynchronous with the UE's serving cell. Thus, the SSBs of the serving cell and target may not be aligned. As shown in FIG. 9, in an asynchronous network, the SSBs 910, 912 from the serving cell and the SSBs 906, 908 from the target cells have a time offset and the SSBs 906, 908 for the target cell may be outside the SMTC window 902. Thus, the UE blindly detects the target cell(s) SSB. Therefore, it is also difficult to configure the measurement gap when target cell SMTC is not available.

For CSI-RS based RRM measurements, a UE-specific CSI-RS can be used for L3 mobility (and no cell specific CSI-RS may be specified). CSI-RS for L3 mobility is based on periodic CSI-RS. Even in synchronous network deployments, neighbor cells may configure different sets of CSI-RS than the serving cell. Thus, the UE cannot derive the neighbor cell's CSI-RS based on the serving cell timing.

The periodic measurement gap (e.g., as shown in FIG. 7) is not effective for SSB-based or CSI-RS based RRM measurements in the asynchronous network because different cells in the same frequency may transmit SSB at different timings. Thus, a frequency layer specific SMTC may not cover all cells. And, even for synchronous networks, because CSI-RS is UE specific, different cells can send different CSI-RS for the UE to measure even if the cells are in the same frequency.

Therefore, techniques for SSB-based and/or CSI-RS based RRM measurement gap for synchronous and/or asynchronous networks are desired.

Example On-Demand Measurement Gap for Inter-Frequency RRM Measurements

Aspects of the present disclosure provide an on-demand measurement gap for inter-frequency radio resource management (RRM) measurements by a user equipment (UE). In some examples, the on-demand measurement gap is provided for channel state information reference signal (CSI-RS) based RRM measurements and/or for synchronization signal block (SSB) based RRM measurements. The on-demand measurement gap may be used for inter-frequency RRM measurements in a synchronous or an asynchronous network deployment.

Figure 10:
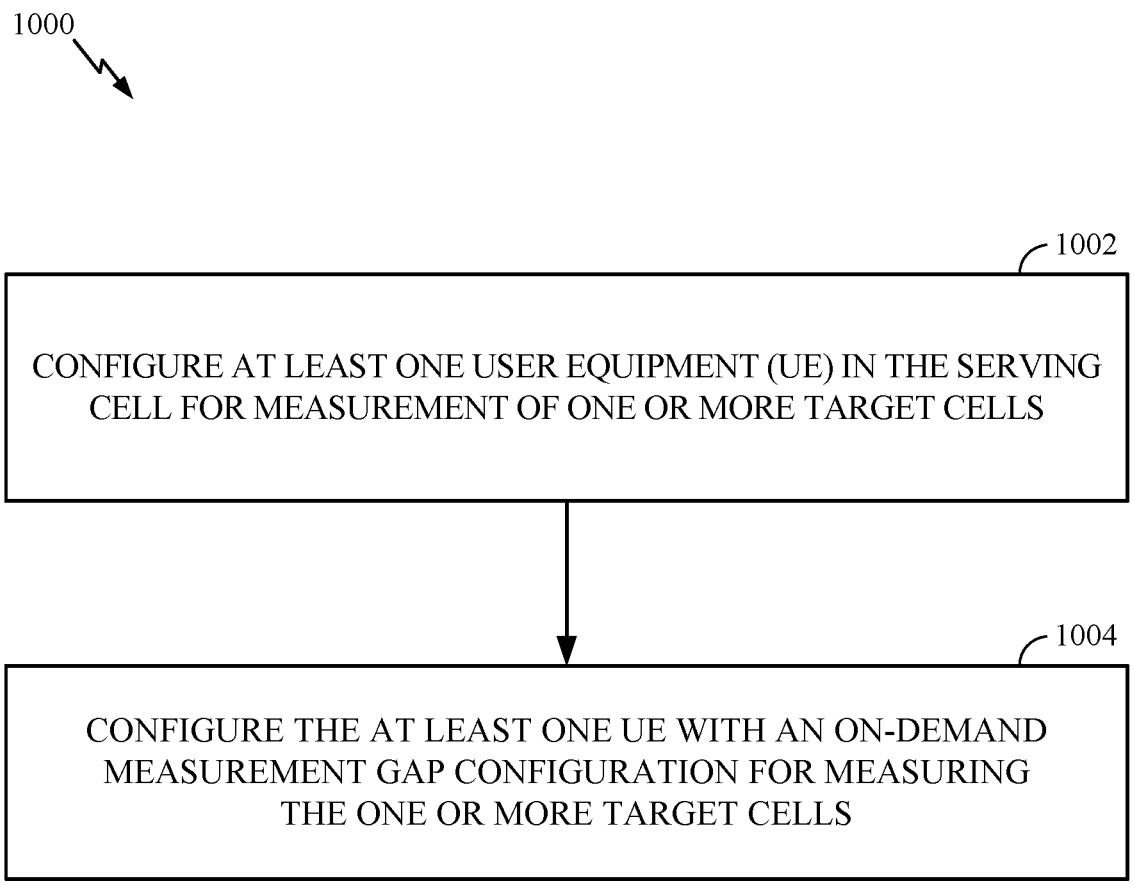
FIG. 10 is a flow diagram illustrating example operations by a BS in a serving cell for wireless communication, in accordance with certain aspects of the present disclosure.

FIG. 10 is a flow diagram illustrating example operations 1000 for wireless communications, in accordance with certain aspects of the present disclosure. The operations 1000 may be performed, for example, by a base station (BS) (e.g., such as a BS 110a in the wireless communication network 100) in a serving cell (e.g., cell 102a, cell 102b, or cell 102b). Operations 1000 may be implemented as software components that are executed and run on one or more processors (e.g., controller/processor 440 of FIG. 4). Further, the transmission and reception of signals by the BS in operations 1000 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

The operations 1000 may begin, at 1002, by configuring at least one UE in the serving cell for measurement (e.g., for SSB-based or CSI-RS-based inter-frequency RRM measurement) of one or more target cells (e.g., on a target frequency). The BS and the target cell may be synchronous or asynchronous. Different target cells in a same frequency may be asynchronous.

According to certain aspects, the BS configures the at least one UE with an on-demand measurement gap configuration for measuring the one or more target cells. The BS may configure the on-demand measurement gap as aperiodic or semi-persistent. In some examples, configuring the on-demand measurement gap includes providing the at least one UE with an indication of a latency duration, k, between reception of an on-demand indicator from the serving cell and the UE retuning to a target frequency of the one or more target cells, and providing the UE with an indication of a duration of the measurement gap, D, until the UE retunes to a serving frequency of the serving cell. For a semi-persistent measurement gap, the measurement gap configuration also includes a periodicity of the measurement gap, P. In some examples, the configuration includes a duration, S, for the UE use the periodic measurement gap or a number of periods (e.g., cycles), N, for the UE to use the periodic measurement gap. In some examples, the UE may be configured to use the periodicity until the on-demand measurement gap is deactivated. The network may send a medium access control (MAC) control element (CE) or downlink control information (DCI) to deactivate the on-demand measurement.

In some examples, the on-demand measurement gap is configured by MAC-CE or DCI. In some examples, the on-demand measurement gap is configured by a combination of semi-static and dynamic signaling. For example, the on-demand measurement gap may be configured via radio resource control (RRC) signaling and DCI and/or MAC-CE is used for activation/deactivation signaling and or to provide part of the configuration information. In some examples, the on-demand measurement gap is requested by the UE (e.g., via a random access channel (RACH) message or a physical uplink control channel (PUCCH) transmission).

The duration of the on-demand measurement gap, D, may be determined based on the a duration for the UE to retune from the serving cell frequency to the target cell frequency, t1, a duration for the UE to perform RRM measurements (e.g., L3 measurement) of the target cell, t2, and a duration for the UE to retune from the target cell frequency back to the serving cell frequency t3, for example D=t1+t2+t3.

Figure 11:
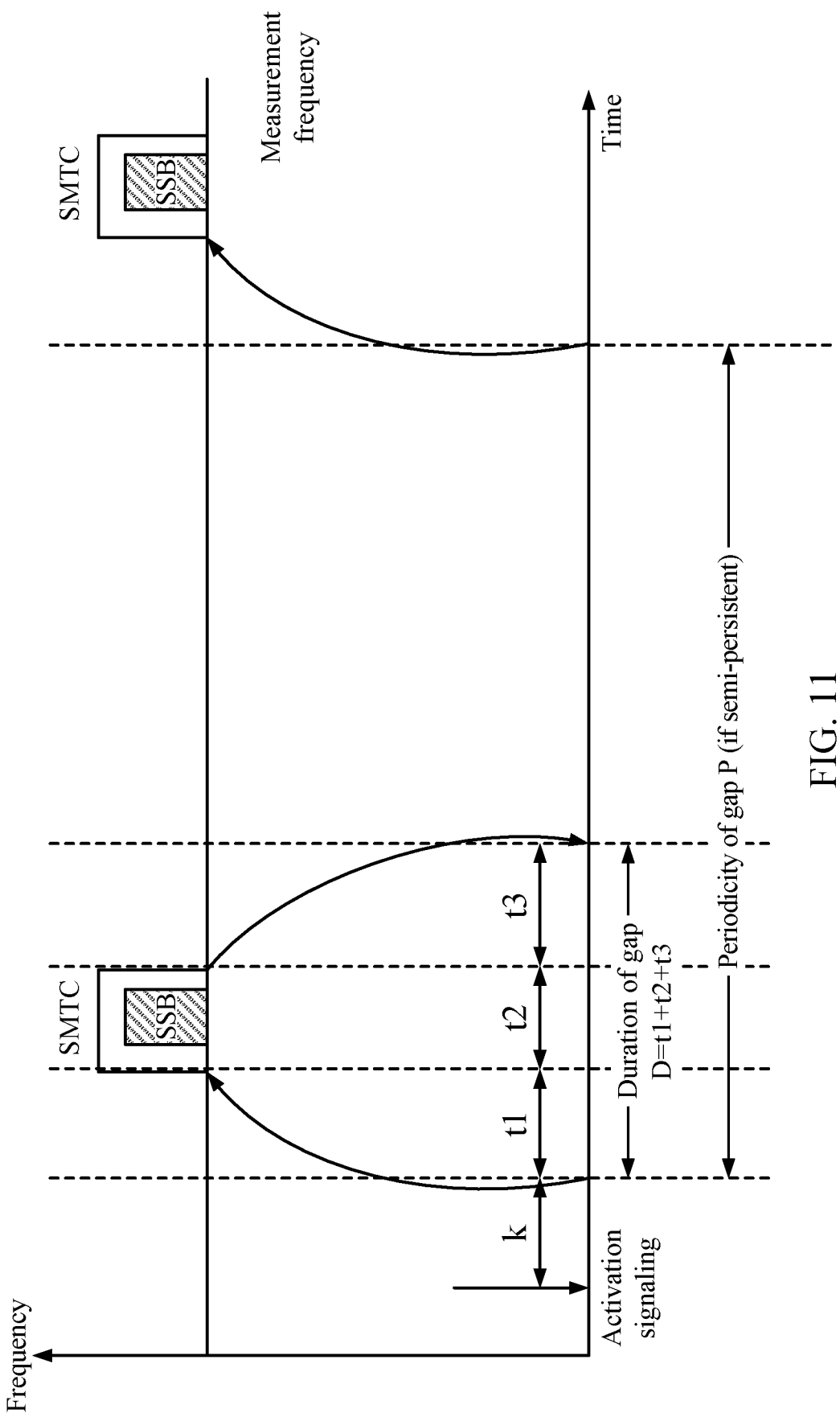
FIG. 11 is an example on-demand measurement gap for SSB-based radio resource management (RRM) measurements of a target cell, in accordance with certain aspects of the present disclosure.

FIG. 11 is an example on-demand measurement gap for SSB-based RRM measurements of a target cell, in accordance with certain aspects of the present disclosure. As shown in FIG. 11, for SSB-based RRM measurements, t2 is the SMTC duration. In some examples, the serving may receive the SMTC of the target cell as assistance information to use for the on-demand measurement gap configuration. The duration of the on-demand measurement gap can then be determined based on the SMTC of the target cell (t2) and the retuning durations (t1 and t2).

Figure 12:
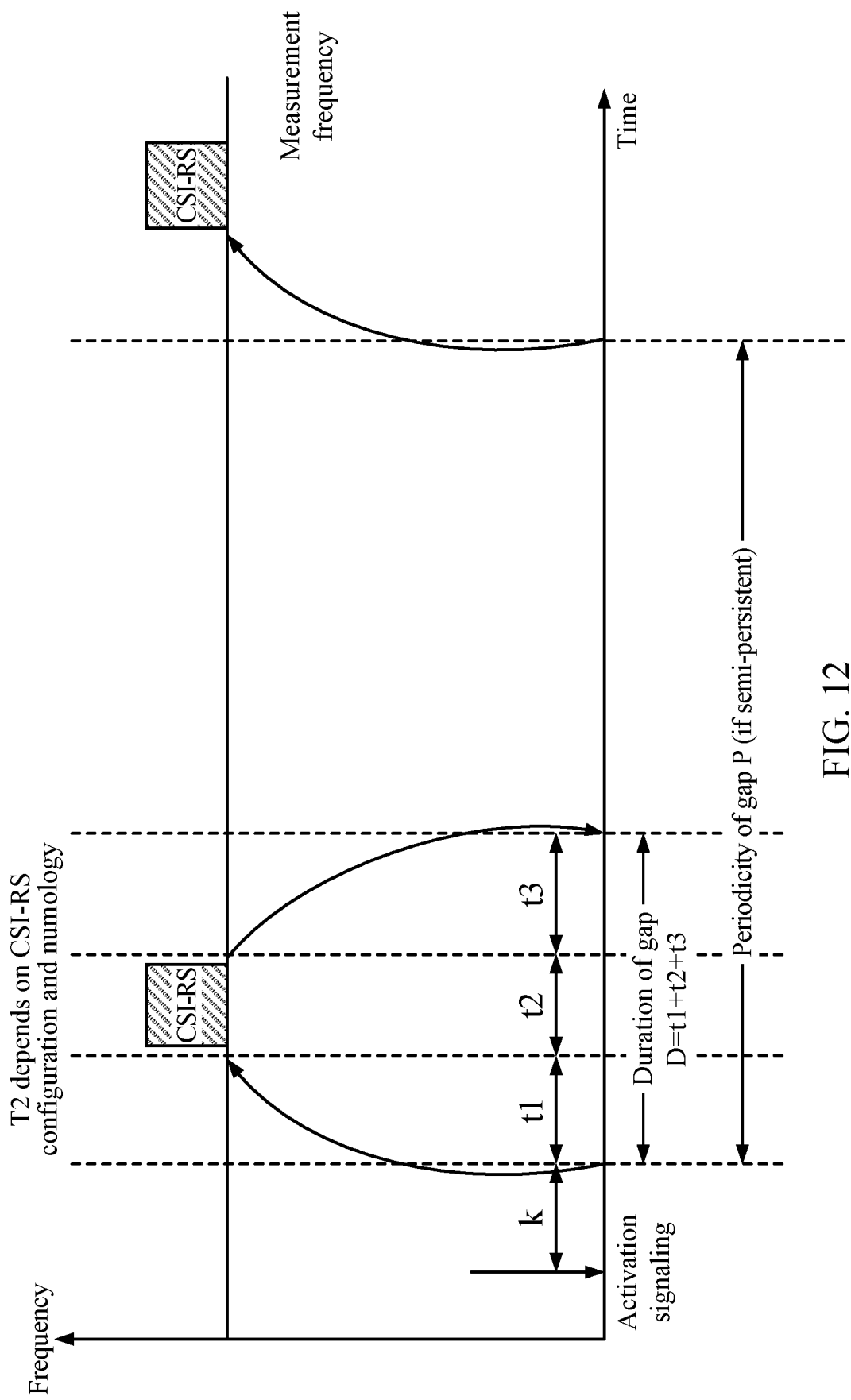
FIG. 12 is an example on-demand measurement gap for channel state information reference signal (CSI-RS)-based RRM measurements of a target cell, in accordance with certain aspects of the present disclosure.

FIG. 12 is an example on-demand measurement gap for CSI-RS based RRM measurements of the target cell, in accordance with certain aspects of the present disclosure. As shown in FIG. 12, for CSI-RS based RRM measurements, t2 depends on the configured CSI-RSs of the target cell. In some examples, the serving cell may receive the CSI-RS configuration and numerology of the target cell as assistance information for the on-demand measurement gap configuration. The duration of the on-demand measurement gap can then be determined based on the CSI-RS configuration and numerology of the target cell (t2) and the retuning durations (t1 and t2).

In some examples, the serving cell may receive the UE's retuning capability/latency between the serving cell frequency and the target cell frequency (or frequencies) as assistance information from the UE. The serving cell can use the assistance information for determining the t1 and t3 for the on-demand measurement gap configuration. In some examples, the network may use/configure a fixed maximum switch latency for the t1 and t3. In this case, the assistance information from the UE may be omitted.

Figure 13:
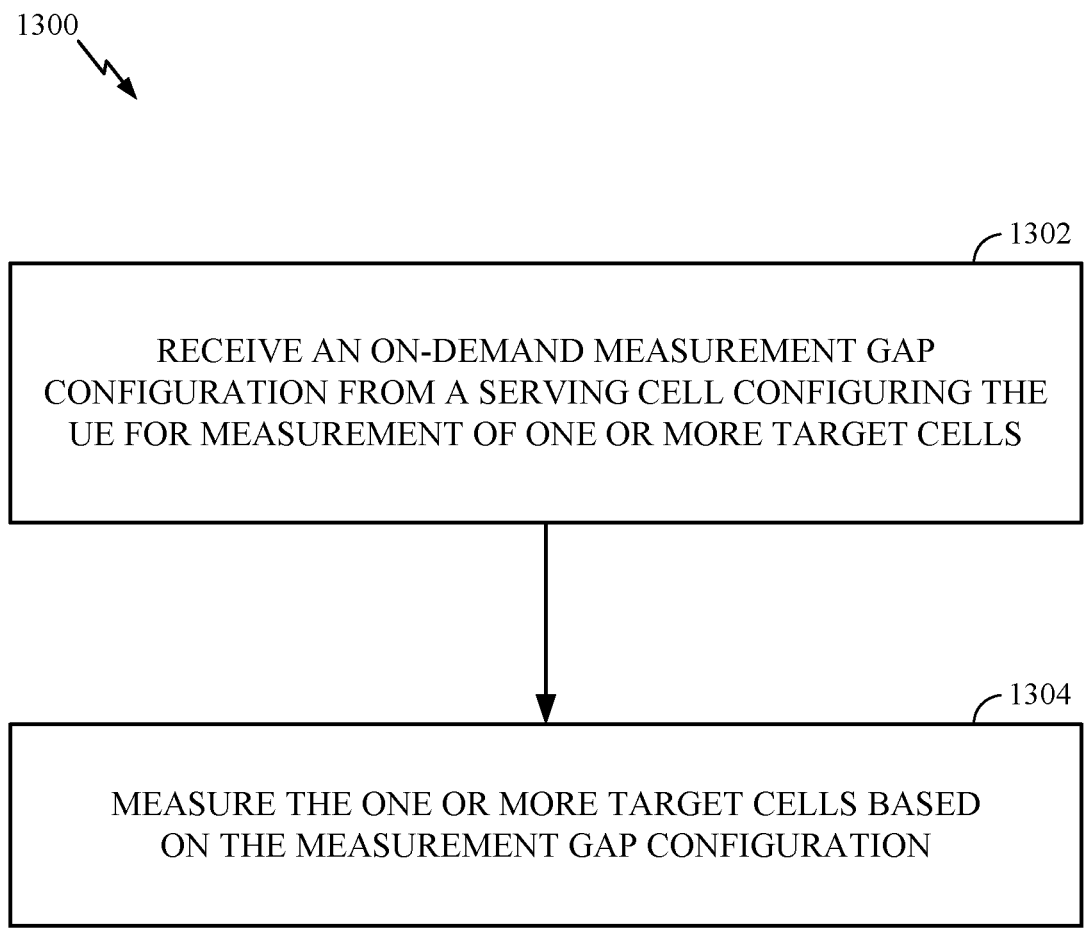
FIG. 13 is a flow diagram illustrating example operations by a UE for wireless communication, in accordance with certain aspects of the present disclosure.

FIG. 13 is a flow diagram illustrating example operations 1300 for wireless communication, in accordance with certain aspects of the present disclosure. The operations 1300 may be performed, for example, by a UE (e.g., such as a UE 120 in the wireless communication network 100). The operations 1300 may be complimentary operation by the UE to the operations 1000 performed by the BS. Operations 1300 may be implemented as software components that are executed and run on one or more processors (e.g., controller/processor 480 of FIG. 4). Further, the transmission and reception of signals by the UE in operations 1300 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

The operations 1300 may begin, at 1302, by receiving an on-demand measurement gap configuration from a serving cell configuring the UE for measurement (e.g., SSB or CSI-RS based inter-frequency RRM measurement) of one or more target cells. The serving cell and the target(s) may be synchronous or asynchronous. The measurement gap may be configured as aperiodic or semi-persistent. The UE may receive an indication of the latency duration k and the duration D. If semi-persistent, the UE receives the periodicity P. The UE receives the duration S or number of cycles N to use the measurement gap or the UE receives DCI or MAC-CE deactivating the measurement gap.

According to certain aspects, the UE provides capability information to the serving cell indicating the duration/latency capability of the UE for retuning between the serving cell frequency and the one or more target cells frequency. According to certain aspects, the UE may receive from the network of an indication/configuration of fixed maximum retuning latency.

In some examples, the on-demand measurement gap configuration is received via a MAC-CE or DCI. In some examples, the on-demand measurement gap is configured via RRC and a MAC-CE or DCI is used for activation/deactivation of the measurement gap and/or to provide a portion of the measurement gap configuration. In some examples, the UE sends the serving cell a request (e.g., via a RACH or PUCCH transmission) for a measurement gap and the measurement gap configuration or activation is received in response to the request.

At 1304, the UE measures the one or more target cells based on the measurement gap configuration. The UE may report the measurements to the serving cell. The UE may use the measurements for a reselection or beam selection decision.

In an asynchronous network deployment, multiple cells (e.g., gNBs) in a same target frequency may use different timings for SSB or CSI-RS transmission. In that case, multiple on-demand measurement gaps may be configured to measure the multiple target cell in one target frequency, which can significantly decrease the UE throughput. Accordingly, aspects of the present disclosure provide for target cells in a same frequency to align their SSB/CSI-RS transmissions.

Figure 14:
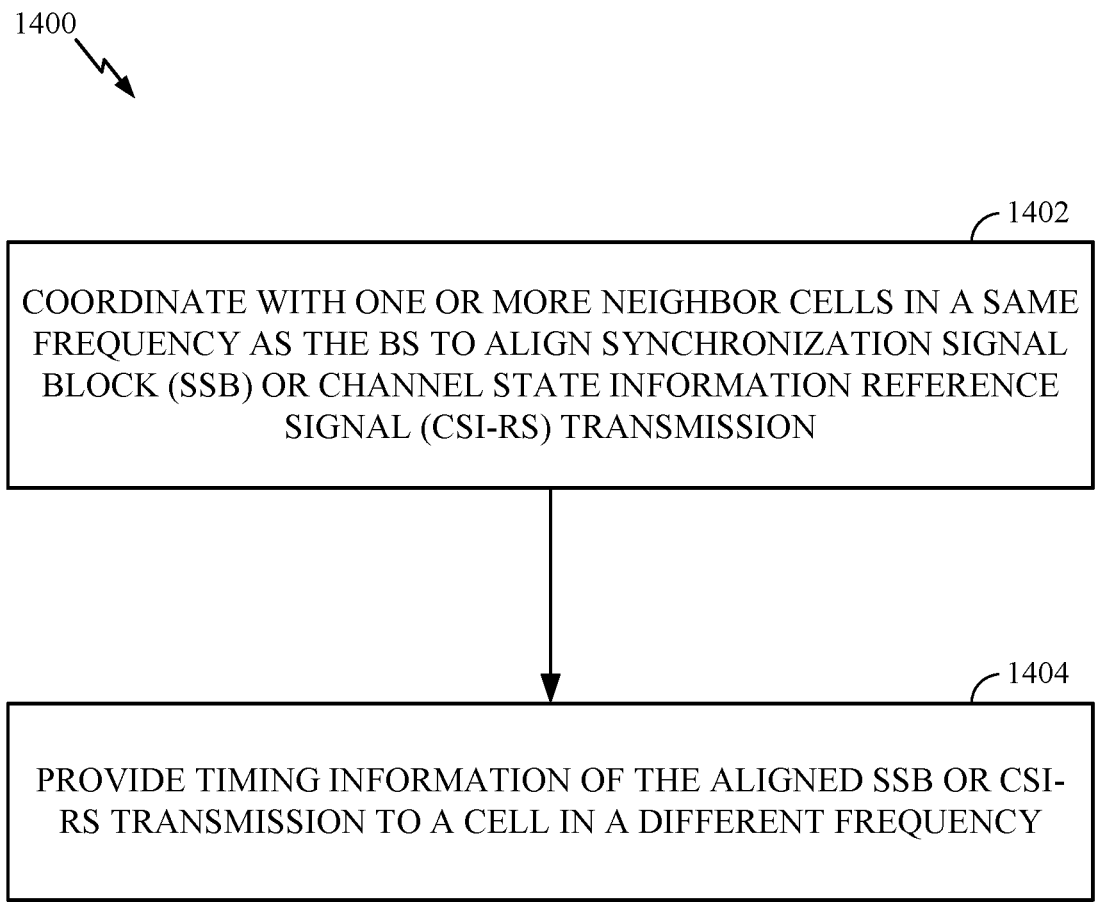
FIG. 14 is a flow diagram illustrating example operations by a BS for wireless communication, in accordance with certain aspects of the present disclosure.

FIG. 14 is a flow diagram illustrating example operations 1400 for wireless communications, in accordance with certain aspects of the present disclosure. The operations 1400 may be performed, for example, by a BS (e.g., such as a BS 110a in the wireless communication network 100).

Figure 15:
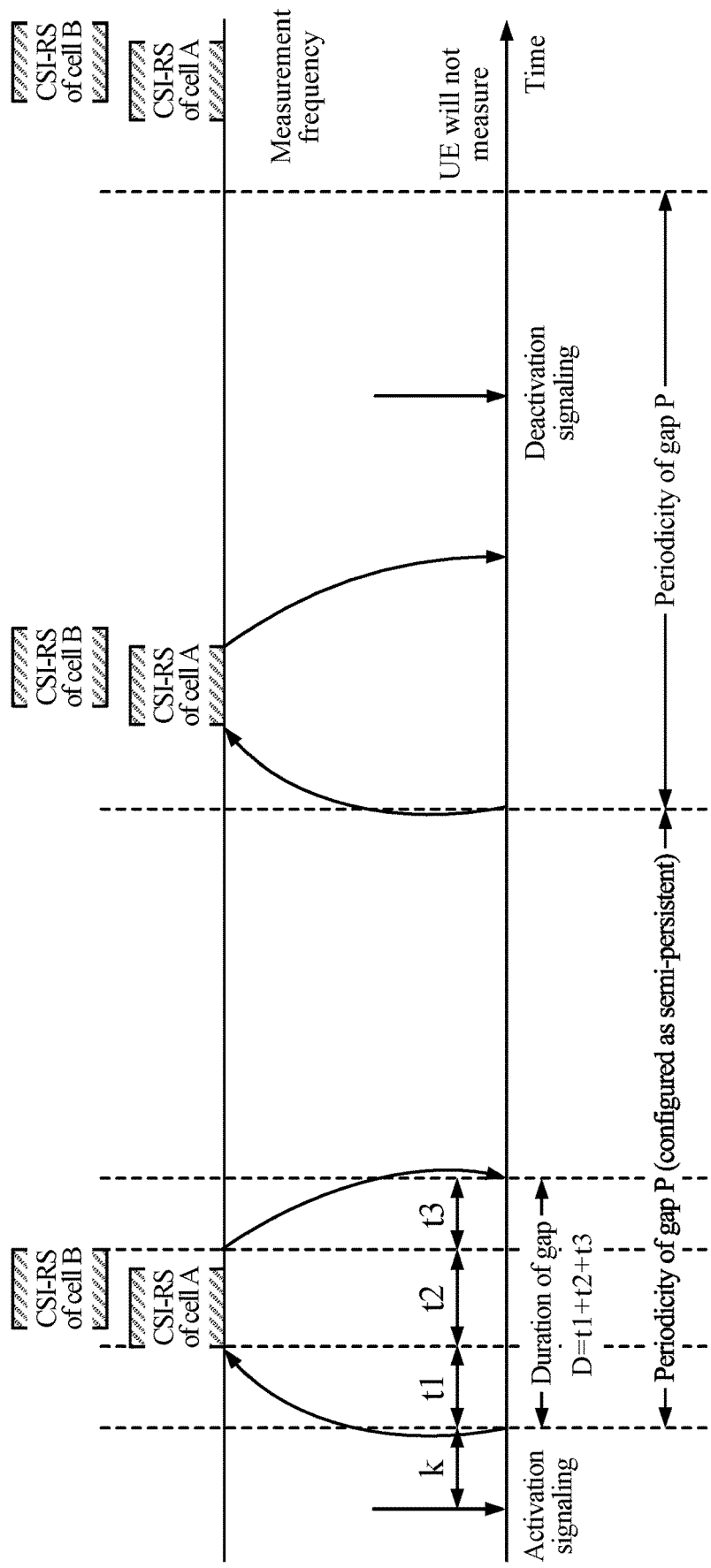
FIG. 15 is an example of aligned CSR-RS transmission by target cells, in accordance with certain aspects of the present disclosure.

The operations 1400 may begin, at 1402, by coordinating with one or more neighbor cells in a same frequency as the BS to align SSB or CSI-RS transmission. For example, the BS and neighbor cells may align a transmission boundary to within a window duration as shown in FIG. 15. For example, the SSB and/or CSI-RS transmissions can be aligned within a t2 duration for a measurement gap configuration.

At 1404, the BS provides timing information of the aligned SSB or CSI-RS transmission to a cell in a different frequency. The BS and the cell in the different frequency may be asynchronous. The timing information may be used the cell in the different frequency to configure a measurement gap for its served UEs to measure the one or more neighbor cells. For example, the cell in the different frequency may use the timing information as the t2 value for the measurement gap configuration.

Figure 16:
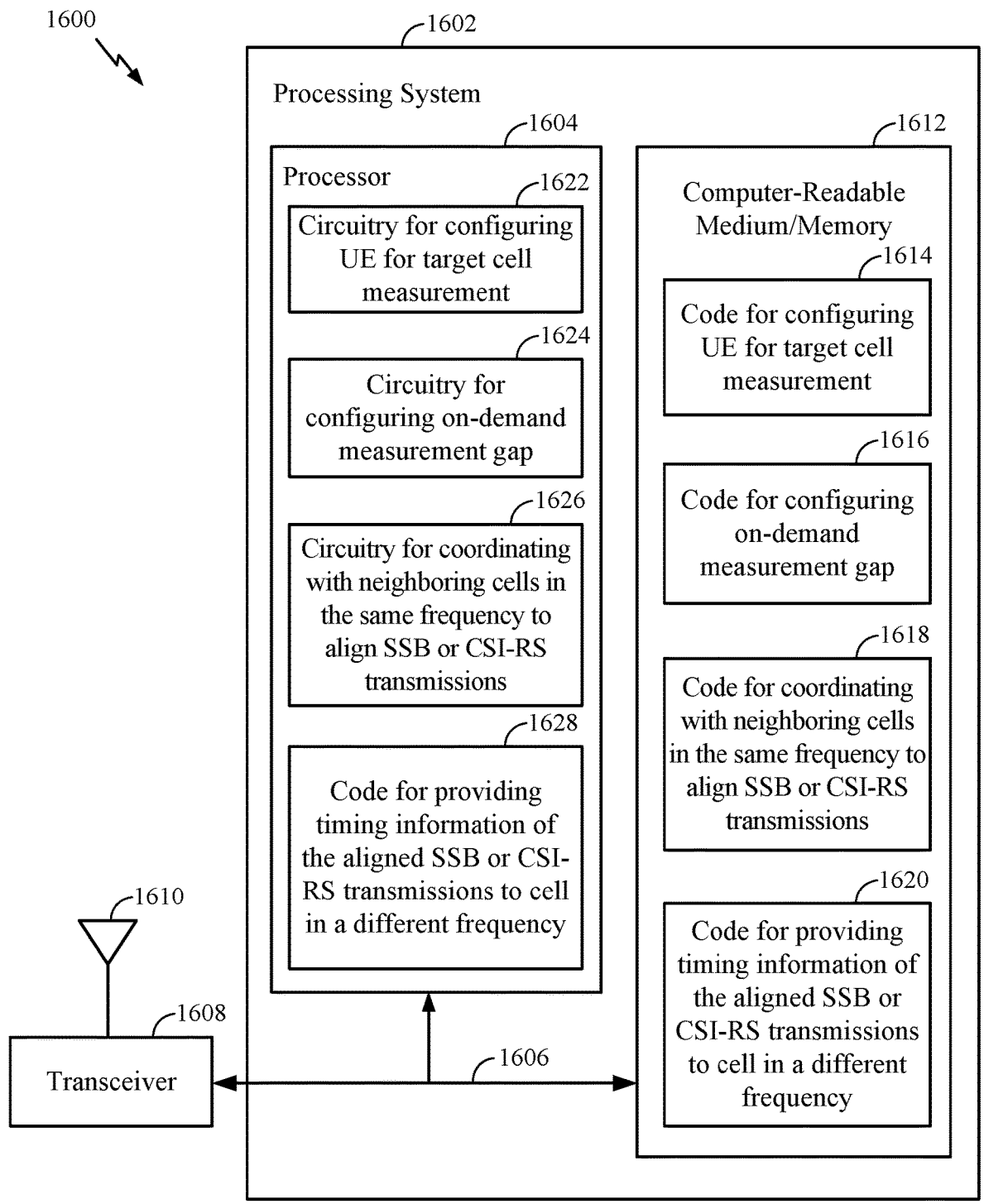
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 10 and/or FIG. 14. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 10 and/or FIG. 14, or other operations for performing the various techniques discussed herein for an on-demand measurement gap for inter-frequency RRM measurements. In certain aspects, computer-readable medium/memory 1612 stores code 1614 for configuring a UE for target cell measurements; code 1616 for configuring the UE with an on-demand measurement gap; code 1618 for coordinating with neighboring cells in the same frequency to align SSB or CSI-RS transmissions; and/or code 1620 for providing timing information of the aligned SSB or CSI-RS transmission to a cell in a different frequency, in accordance with aspects of the present disclosure. In certain aspects, the processor 1604 has circuitry configured to implement the code stored in the computer-readable medium/memory 1612. The processor 1604 includes circuitry 1622 for configuring a UE for target cell measurements; circuitry 1624 for configuring the UE with an on-demand measurement gap; circuitry 1626 for coordinating with neighboring cells in the same frequency to align SSB or CSI-RS transmissions; and/or circuitry 1628 for providing timing information of the aligned SSB or CSI-RS transmission to a cell in a different frequency, in accordance with aspects of the present disclosure.

Figure 17:
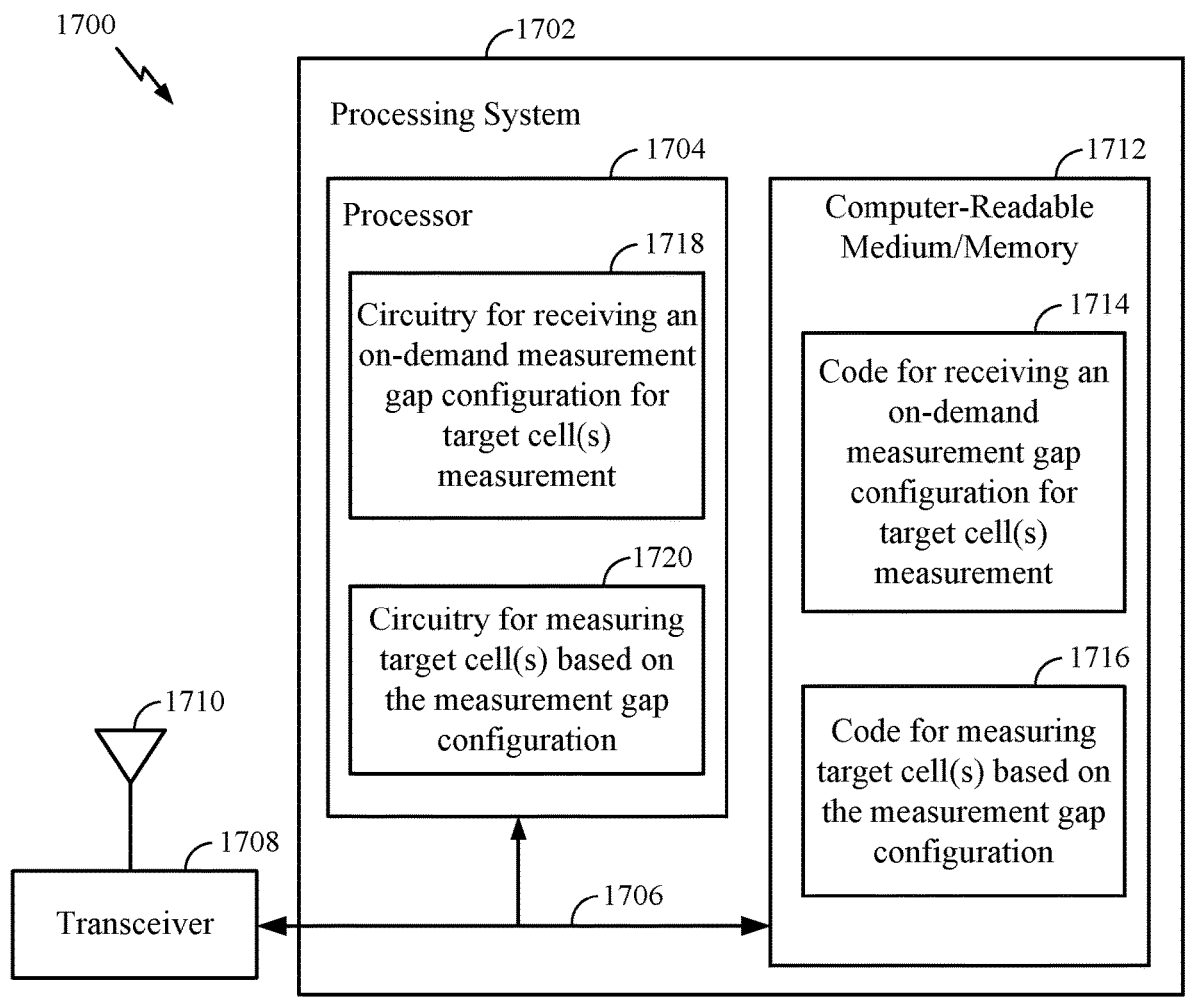
FIG. 17 illustrates a communications device that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 13. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 13, or other operations for performing the various techniques discussed herein for an on-demand measurement gap for inter-frequency RRM measurements. In certain aspects, computer-readable medium/memory 1712 stores code 1714 for receiving an on-demand measurement gap configuration for target cell(s) measurement; and code 1716 for measuring target cell(s) based on the measurement gap configuration, in accordance with aspects of the present disclosure. In certain aspects, the processor 1704 has circuitry configured to implement the code stored in the computer-readable medium/memory 1712. The processor 1704 includes circuitry 1718 for receiving an on-demand measurement gap configuration for target cell(s) measurement; and circuitry 1720 for measuring target cell(s) based on the measurement gap configuration, in accordance with aspects of the present disclosure.

Example Aspects

In a first aspect, a method for wireless communications by a user equipment (UE) comprises receiving an on-demand measurement gap configuration from a serving cell configuring the UE for measurement of one or more target cells; and measuring the one or more target cells based on the measurement gap configuration.

In a second aspect, alone or in combination with the first aspect, the serving cell and the one or more target cells are asynchronous; and different target cells in a same frequency are asynchronous.

In a third aspect, alone or in combination with one or more of the first or second aspects, the UE is configured to measure inter-frequency radio resource measurement (RRM) of a synchronization signal block (SSB) or a UE-specific channel state information reference signal (CSI-RS) of the one or more target cells.

In a fourth aspect, alone or in combination with one or more of the first through third aspects, the configured measurement gap is aperiodic or semi-persistent.

In a fifth aspect, alone or in combination with one or more of the first through fourth aspects, receiving the on-demand measurement gap configuration comprises receiving an indication of a latency duration between reception of an on-demand indicator from the serving cell and the UE retuning to a target frequency of the one or more target cells and indication of a duration of the measurement gap until the UE retunes to a serving frequency of the serving cell.

In a sixth aspect, alone or in combination with one or more of the first through fifth aspects, the configured measurement gap is semi-persistent; and receiving the on-demand measurement gap configuration further comprises receiving an indication of a periodicity of the measurement gap and a duration for the UE use the periodic measurement gap.

In a seventh aspect, alone or in combination with one or more of the first through sixth aspects, the configured measurement gap is semi-persistent; and receiving the on-demand measurement gap configuration further comprises receiving an indication of a periodicity of the measurement gap and a number of periods to use the periodic measurement gap.

In an eighth aspect, alone or in combination with one or more of the first through seventh aspects, the configured measurement gap is semi-persistent; receiving the on-demand measurement gap configuration further comprises receiving an indication of a periodicity of the measurement gap; and the method further comprises receiving an indication from the serving cell to deactivate the periodic measurement gap.

In a ninth aspect, alone or in combination with one or more of the first through eighth aspects, the signaling to deactivate the periodic measurement gap comprises a medium access control (MAC) control element (CE) or downlink control information (DCI).

In a tenth aspect, alone or in combination with one or more of the first through ninth aspects, the method further comprises providing capability information to the serving cell indicating a first duration for the UE to retune to the target frequency and the third duration; or receiving an indication from the serving cell of a fixed retuning latency.

In an eleventh aspect, alone or in combination with one or more of the first through third aspects, the on-demand measurement gap configuration is received via a medium access control (MAC) control element (CE) or downlink control information (DCI).

In a twelfth aspect, alone or in combination with one or more of the first through eleventh aspects, the on-demand measurement gap configuration is received via radio resource control (RRC) signaling; and the on-demand measurement gap is activated via a medium access control (MAC) control element (CE) or downlink control information (DCI).

In a thirteenth aspect, alone or in combination with one or more of the first through twelfth aspects, the method further comprising sending a request to serving cell for the measurement gap.

In a fourteenth aspect, alone or in combination with one or more of the first through thirteenth aspects, the request is sent via a random access channel (RACH) message or a physical uplink control channel (PUCCH) transmission.

In a fifteenth aspect, a method for wireless communications by a base station (BS) in a serving cell, comprises configuring at least one user equipment (UE) in the serving cell for measurement of one or more target cells; and configuring the at least one UE with an on-demand measurement gap configuration for measuring the one or more target cells.

In a sixteenth aspect, alone or in combination with the fifteenth aspect, the serving cell and the one or more target cells are asynchronous; and different target cells in a same frequency are asynchronous In a seventeenth aspect, alone or in combination with one or more of the fifteenth or sixteenth aspects, the BS configures the at least one UE to measure a synchronization signal block (SSB) or a UE-specific channel state information reference signal (CSI-RS) of the target cell.

In an eighteenth aspect, alone or in combination with one or more of the fifteenth through seventeenth aspects, the configured measurement gap is aperiodic or semi-persistent.

In a nineteenth aspect, alone or in combination with one or more of the fifteenth through eighteenth aspects, configuring the on-demand measurement gap comprises providing the at least one UE with an indication of a latency duration between reception of an on-demand indicator from the serving cell and the UE retuning to a target frequency of the one or more target cells; and a duration of the measurement gap until the UE retunes to a serving frequency of the serving cell.

In a twentieth aspect, alone or in combination with one or more of the fifteenth through nineteenth aspects, the configured measurement gap is semi-persistent; and configuring the on-demand measurement gap further comprises providing an indication of a periodicity of the measurement gap and a duration for the UE use the periodic measurement gap.

In a twenty-first aspect, alone or in combination with one or more of the fifteenth through twentieth aspects, the configured measurement gap is semi-persistent; and configuring the on-demand measurement gap further comprises providing an indication of a periodicity of the measurement gap and a number of periods to use the periodic measurement gap.

In a twenty-second aspect, alone or in combination with one or more of the fifteenth through twenty-first aspects, the configured measurement gap is semi-persistent; configuring the on-demand measurement gap further comprises providing an indication of a periodicity of the measurement gap; and the method further comprises providing an indication to deactivate the periodic measurement gap.

In a twenty-third aspect, alone or in combination with one or more of the fifteenth through twenty-second aspects, the method further comprises determining the duration of the measurement gap based on a first duration for the UE to retune to the target frequency, a second duration to perform measurements of the one or more target cells, and a third duration for the UE to tune back to the serving frequency.

In a twenty-fourth aspect, alone or in combination with one or more of the fifteenth through twenty-third aspects, the method further comprises receiving capability information from the UE indicating the first duration and the third duration; or determining the first duration and the third duration based on a fixed retuning latency.

In a twenty-fifth aspect, alone or in combination with one or more of the fifteenth through twenty-fourth aspects, the method further comprises receiving an indication from the one or more target cells of the second duration; and the second duration comprises a duration of synchronization signal block (SSB) transmissions by the one or more target cells or a duration associated with a channel state information reference signal (CSI-RS) configuration and a numerology of the one or more target cells.

In a twenty-sixth aspect, alone or in combination with one or more of the fifteenth through twenty-fifth aspects, the on-demand measurement gap is configured via at least one of: radio resource control (RRC) signaling, medium access control (MAC) control element (CE), or downlink control information (DCI).

In a twenty-seventh aspect, a method for wireless communications by a base station (BS), comprises coordinating with one or more neighbor cells in a same frequency as the BS to align synchronization signal block (SSB) or channel state information reference signal (CSI-RS) transmission; and providing timing information of the aligned SSB or CSI-RS transmission to a cell in a different frequency.

In a twenty-eighth aspect, alone or in combination with the twenty-seventh aspect, the BS and the cell in the different frequency are asynchronous.

In a twenty-ninth aspect, alone or in combination with one or more of the twenty-seventh or twenty-eighth aspects, aligning the SSB or CSI-RS transmission comprises aligning a transmission boundary within a window duration.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU). A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10, 13, and 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), the method comprising:
   providing capability information to a serving cell indicating a first duration for the UE to retune to a target cell frequency of one or more target cells and a second duration for the UE to retune back to a serving frequency of the serving cell or receiving an indication from the serving cell of a fixed retuning latency;
   receiving an on-demand measurement gap configuration from the serving cell configuring a semi-persistent or aperiodic measurement gap for measurement of the one or more target cells; and
   measuring the one or more target cells during the semi-persistent or aperiodic measurement gap.

2. The method of claim 1, wherein:
   the serving cell and the one or more target cells are asynchronous; and
   different target cells, of the one or more target cells, in a same frequency are asynchronous.

3. The method of claim 1, wherein the UE is configured to perform inter-frequency radio resource measurement (RRM) of a synchronization signal block (SSB) or a UE-specific channel state information reference signal (CSI-RS) of the one or more target cells.

4. The method of claim 1, wherein receiving the on-demand measurement gap configuration comprises receiving a first indication of a latency duration between reception of an on-demand indicator from the serving cell and the UE retuning to the target cell frequency of the one or more target cells and a second indication of a duration of the measurement gap until the UE retunes to the serving frequency of the serving cell.

5. The method of claim 4, wherein:
   the on-demand measurement gap configuration configures the semi-persistent measurement gap; and
   receiving the on-demand measurement gap configuration further comprises receiving a third indication of a periodicity of the semi-persistent measurement gap and a duration for the UE to use the on-demand measurement gap configuration.

6. The method of claim 4, wherein:
   the on-demand measurement gap configuration configures the semi-persistent measurement gap; and
   receiving the on-demand measurement gap configuration further comprises receiving a third indication of a periodicity of the semi-persistent measurement gap and a number of periods to use the on-demand measurement gap configuration.

7. The method of claim 4, wherein:
   the on-demand measurement gap configuration configures the semi-persistent measurement gap;
   receiving the on-demand measurement gap configuration further comprises receiving a third indication of a periodicity of the semi-persistent measurement gap; and
   the method further comprises receiving a fourth indication from the serving cell to deactivate the on-demand measurement gap configuration.

8. The method of claim 7, wherein the fourth indication to deactivate the on-demand measurement gap configuration comprises a medium access control (MAC) control element (CE) or downlink control information (DCI).

9. The method of claim 1, wherein the on-demand measurement gap configuration is received via a medium access control (MAC) control element (CE) or downlink control information (DCI).

10. The method of claim 1, wherein:
    the on-demand measurement gap configuration is received via radio resource control (RRC) signaling; and
    the on-demand measurement gap is activated via a medium access control (MAC) control element (CE) or downlink control information (DCI).

11. The method of claim 1, further comprising sending a request to the serving cell for a measurement gap, wherein the on-demand measurement gap configuration is received in response to the request.

12. The method of claim 11, wherein the request is sent via a random access channel (RACH) message or a physical uplink control channel (PUCCH) transmission.

13. A method for wireless communications by a base station (BS) in a serving cell, the method comprising:
    configuring at least one user equipment (UE) in the serving cell for measurement of one or more target cells;
    determining a duration of a semi-persistent or aperiodic measurement gap for the at least one UE based on a first duration for the at least one UE to retune to a target frequency of the one or more target cells, a second duration for the at least one UE to perform measurements of the one or more target cells, and a third duration for the at least one UE to tune back to a serving frequency of the serving cell; and configuring the at least one UE with an on-demand measurement gap configuration configuring the semi-persistent or aperiodic measurement gap for measuring the one or more target cells.

14. The method of claim 13, wherein:
the serving cell and the one or more target cells are asynchronous; and
different target cells, of the one or more target cells, in a same frequency are asynchronous.

15. The method of claim 13, wherein the configuring the at least one UE for measurement of the one or more target cells comprises configuring the at least one UE to measure a synchronization signal block (SSB) or a UE-specific channel state information reference signal (CSI-RS) of the one or more target cells.

16. The method of claim 13, wherein the configuring the on-demand measurement gap configuration comprises:
providing the at least one UE with a first indication of a latency duration between reception of an on-demand indicator from the serving cell and the at least one UE retuning to the target frequency of the one or more target cells; and
a second indication of a duration of the semi-persistent or aperiodic measurement gap until the at least one UE retunes to the serving frequency of the serving cell.

17. The method of claim 16, wherein:
the on-demand measurement gap configuration configures the semi-persistent measurement gap; and
the configuring the on-demand measurement gap configuration further comprises providing third indication of a periodicity of the semi-persistent measurement gap and a duration for the at least one UE to use the on-demand measurement gap configuration.

18. The method of claim 16, wherein:
the on-demand measurement gap configuration configures the semi-persistent measurement gap; and
the configuring the on-demand measurement gap configuration further comprises providing a third indication of a periodicity of the semi-persistent measurement gap and a number of periods to use the on-demand measurement gap configuration.

19. The method of claim 16, wherein:
the on-demand measurement gap configuration configures the semi-persistent measurement gap;
configuring the on-demand measurement gap configuration further comprises providing a third indication of a periodicity of the semi-persistent measurement gap; and
the method further comprises providing a fourth indication to deactivate the on-demand measurement gap configuration.

20. The method of claim 13, wherein:
the method further comprises receiving capability information from the UE indicating the first duration and the third duration; or
determining the first duration and the third duration based on a fixed retuning latency.

21. The method of claim 13, wherein:
the method further comprises receiving an indication from the one or more target cells of the second duration; and
the second duration comprises a duration of synchronization signal block (SSB) transmissions by the one or more target cells or a duration associated with a channel state information reference signal (CSI-RS) configuration and a numerology of the one or more target cells.

22. The method of claim 13, wherein the on-demand measurement gap configuration is configured via at least one of: radio resource control (RRC) signaling, medium access control (MAC) control element (CE), or downlink control information (DCI).

23. An apparatus for wireless communications, the apparatus comprising:
means for providing capability information to a serving cell indicating a first duration for the apparatus to retune to a target cell frequency of one or more target cells and a second duration for the apparatus to retune back to a serving frequency of the serving cell or receiving an indication from the serving cell of a fixed retuning latency;
means for receiving an on-demand measurement gap configuration from the serving cell configuring a semi-persistent or aperiodic measurement gap for measurement of the one or more target cells; and
means for measuring the one or more target cells during the semi-persistent or aperiodic measurement gap.

* * * * *